(12) United States Patent
Lee

(10) Patent No.: US 7,206,165 B2
(45) Date of Patent: Apr. 17, 2007

(54) NOISE REDUCING APPARATUS FOR DISK DRIVE

(75) Inventor: Hong-kwon Lee, Seongnam-si (KR)

(73) Assignee: Samsung Electronics Co., Ltd., Suwon-Si (KR)

(\*) Notice: Subject to any disclaimer, the term of this patent is extended or adjusted under 35 U.S.C. 154(b) by 367 days.

(21) Appl. No.: 10/898,163

(22) Filed: Jul. 26, 2004

(65) Prior Publication Data

US 2005/0041333 A1    Feb. 24, 2005

(30) Foreign Application Priority Data

Aug. 23, 2003    (KR)    ............... 10-2003-0058509

(51) Int. Cl.
*G11B 17/02*    (2006.01)
(52) U.S. Cl. .................................... 360/97.01
(58) Field of Classification Search ............... None
See application file for complete search history.

(56) References Cited

U.S. PATENT DOCUMENTS 6,128,159 A * 10/2000 Ino ..................... 360/97.02
6,177,173 B1 * 1/2001 Nelson ................. 360/97.01
6,256,165 B1 * 7/2001 Kim .................... 360/97.01
6,950,275 B1 * 9/2005 Ali et al. .............. 360/97.02

FOREIGN PATENT DOCUMENTS

JP    9-128955    5/1997
KR    1998-086539    12/1998

OTHER PUBLICATIONS

Korean Office Action issued May 25, 2005.

\* cited by examiner

*Primary Examiner*—Robert S. Tupper
(74) *Attorney, Agent, or Firm*—Staas & Halsey LLP

(57) ABSTRACT

A disk drive includes a base member, a spindle motor installed on the base member to rotate a disk for data storage, an actuator installed on the base member to move a read/write head to a predetermined position on the disk, a cover member assembled to an upper portion of the base member, and a noise reducing apparatus. The noise reducing apparatus includes a groove formed on an outer surface of the cover member to a predetermined depth, a plurality of through holes formed on a bottom surface of the groove, a sound-absorbing member accommodated in the groove to absorb noise generated from the inside of the disk drive, and a cover plate attached to the outer surface of the cover member to cover the sound-absorbing member.

7 Claims, 6 Drawing Sheets

NOISE REDUCING APPARATUS FOR DISK DRIVE

CROSS-REFERENCE TO RELATED APPLICATION

This application claims the benefit of Korean Patent Application No. 2003-58509, filed on Aug. 23, 2003 in the Korean Intellectual Property Office, the disclosure of which is incorporated herein in its entirety by reference.

BACKGROUND OF THE INVENTION

1. Field of the Invention

The present invention relates to a disk drive, and more particularly, to a noise reducing apparatus for a disk drive which can effectively reduce noise generated from the inside of the disk drive and dissipated to the outside thereof.

2. Description of the Related Art

Hard disk drives (HDDs), which are data storage devices used for computers, use read/write heads to reproduce or record data with respect to a disk. In the HDD, the read/write head performs its functions while being moved by an actuator to a desired position in a state of being lifted to a predetermined height from a recording surface of a rotating disk.

FIG. 1 is an exploded perspective view illustrating the configuration of a conventional hard disk drive. Referring to FIG. 1, a conventional hard disk drive includes a base member 11. On the base member 11, a spindle motor 30 rotates a disk 20 and an actuator 40 moves a read/write head, which records and reproduces data, to a desired position on the disk 20.

The actuator 40 includes a swing arm 42 rotatably coupled to a pivot bearing 41 installed on the base member 11. The actuator 40 includes a suspension 43 installed at one end portion of the swing arm 42 and supporting a slider having the head mounted thereon toward a surface of the disk 20 to be elastically biased, and a voice coil motor (VCM) 45 to rotate the swing arm 42. The voice coil motor 45 is controlled by a servo control system to rotate the swing arm 42 in a direction following the Fleming's left hand rule by the interaction between a current applied to a VCM coil and a magnetic field generated by a magnet. That is, when the power of the hard disk drive is on and the disk 20 starts to rotate, the voice coil motor 45 rotates the swing arm 42 counterclockwise to move the head toward a position above a recording surface of the disk 20. When the power of the hard disk drive is off and the disk 20 stops rotating, the voice coil motor 45 rotates the swing arm 42 clockwise so that the head is moved out of the disk 20.

A cover member 12 is assembled to the base member 11 by using a plurality of screws 19. The cover member 12 protects the disk 20 and the actuator 40 by encompassing the same so as to prevents intrusion of dust or moisture into the inside of the disk drive and a propagation of noise from the inside of the disk drive to the outside thereof. The cover member 12 includes a groove 13 to reduce the vibration of the disk 20 by reducing the interval between the disk 20 and the cover member 12. A circulation filter 50 to filter particles inside the disk drive is provided at one corner of the base member 11.

FIG. 2 is a sectional view illustrating the route along which noise is transferred in the conventional disk drive. Referring to FIG. 2, noise is generated when the disk 20 rotates at a high speed and the actuator 40 performs a read/write/seek function. The noise generated in the disk drive is dissipated outwardly through the base member 11 and the cover member 12 as indicated by the wavy lines (representing noise). Such noise can be classified into structural-borne noise and an air-borne noise based upon the transfer route. The structural-borne noise is generated by the rotation of the spindle motor 30 and is transferred to the base member 11 to be dissipated outwardly. The air-borne noise is generated by a change in the pressure of fluid (that is, air) during the vibration of the disk 20 and the rotation of the disk 20. The air-borne noise is transferred to the cover member 12 and dissipated to the outside of the disk drive.

Conventionally, since ball bearings are mainly used for the spindle motor 30, the structural-borne noise is generated by the vibration generated due to defective ball bearings and has taken the most portion of noise generated in the disk drive. Thus, the structural-borne noise transferred to the base member 11 is reduced by attaching a damping member 60 on the outer surface of the base member 11. Recently, fluid dynamic bearings (FDB) have been increasingly used for the spindle motor 30 as the rotation speed of the disk drive and the track per inch (TPI) of the disk 20 increase. Accordingly, in the disk drive, while the structural-borne noise is decreased, the portion of the noise attributed to the air-borne noise increases. As a result, the use of the damping member 60 does not provide a great effect on the reduction of noise in the disk drive.

SUMMARY OF THE INVENTION

To solve the above and/or other problems, an aspect of the present invention provides a noise reducing apparatus which can effectively reduce noise generated from the disk drive and dissipated to the outside thereof and filter particles in flowing air, and a disk drive having the same.

Additional aspects and/or advantages of the invention will be set forth in part in the description which follows and, in part, will be obvious from the description, or may be learned by practice of the invention.

According to an aspect of the present invention, a noise reducing apparatus for a disk drive including a base member, a spindle motor installed on the base member to rotate a disk for data storage, an actuator installed on the base member to move a read/write head to a predetermined position on the disk, and a cover member assembled to an upper portion of the base member, includes a groove formed on an outer surface of the cover member to a predetermined depth, a plurality of through holes formed on a bottom surface of the groove, a sound-absorbing member accommodated in the groove to absorb noise generated from the inside of the disk drive, and a cover plate attached to the outer surface of the cover member to cover the sound-absorbing member.

According to an aspect of the invention, the through holes are arranged in a plurality of rows on the bottom surface of the groove.

According to another aspect of the present invention, a noise reducing apparatus for a disk drive including a base member, a spindle motor installed on the base member to rotate a disk for data storage, an actuator installed on the base member to move a read/write head to a predetermined position on the disk, and a cover member assembled to an upper portion of the base member, includes a groove formed on an inner surface of the cover member to a predetermined depth, a sound-absorbing member accommodated in the groove to absorb noise generated from the inside of the disk drive, a cover plate attached to the inner surface of the cover member to cover the sound-absorbing member, and a plurality of through holes formed in the cover plate.

According to an aspect of the invention, the through holes are arranged in a plurality of rows on the cover plate.

According to an aspect of the invention, the groove has a "C" shape above the disk with an opening toward an actuator, the sound-absorbing member is formed of a porous material, the cover plate is formed of a metal plate, the metal plate is a stainless steel plate, and the cover plate is attached to the cover member by using an adhesive.

BRIEF DESCRIPTION OF THE DRAWINGS

These and/or other features and advantages of the present invention will become more apparent and more readily appreciated by describing in detail preferred embodiments thereof with reference to the accompanying drawings in which.

DETAILED DESCRIPTION OF THE EMBODIMENTS

Figure 1:
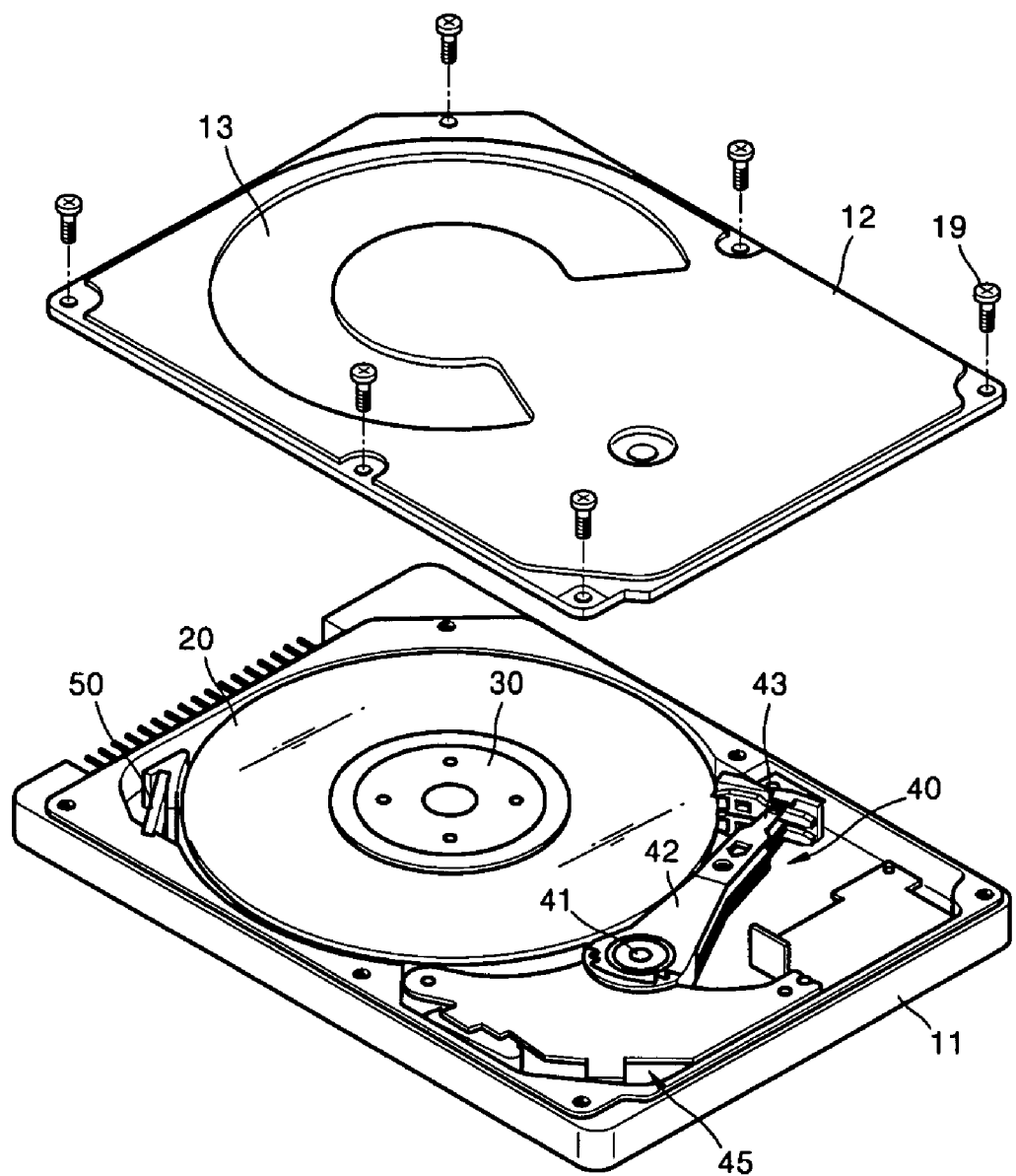
FIG. 1 is an exploded perspective view illustrating the configuration of a conventional hard disk drive.
Figure 2:
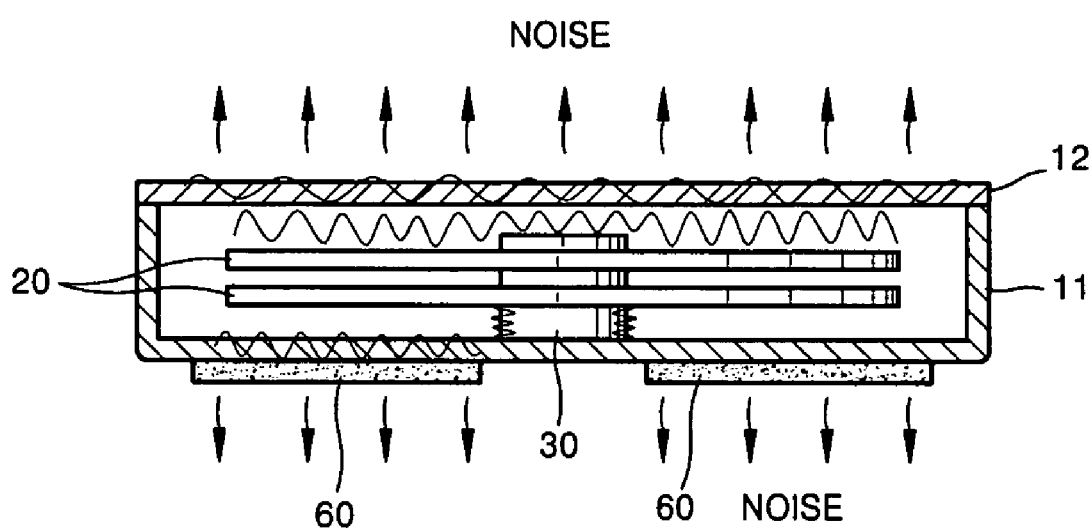
FIG. 2 is a sectional view illustrating the route along which noise is transferred in the conventional disk drive.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
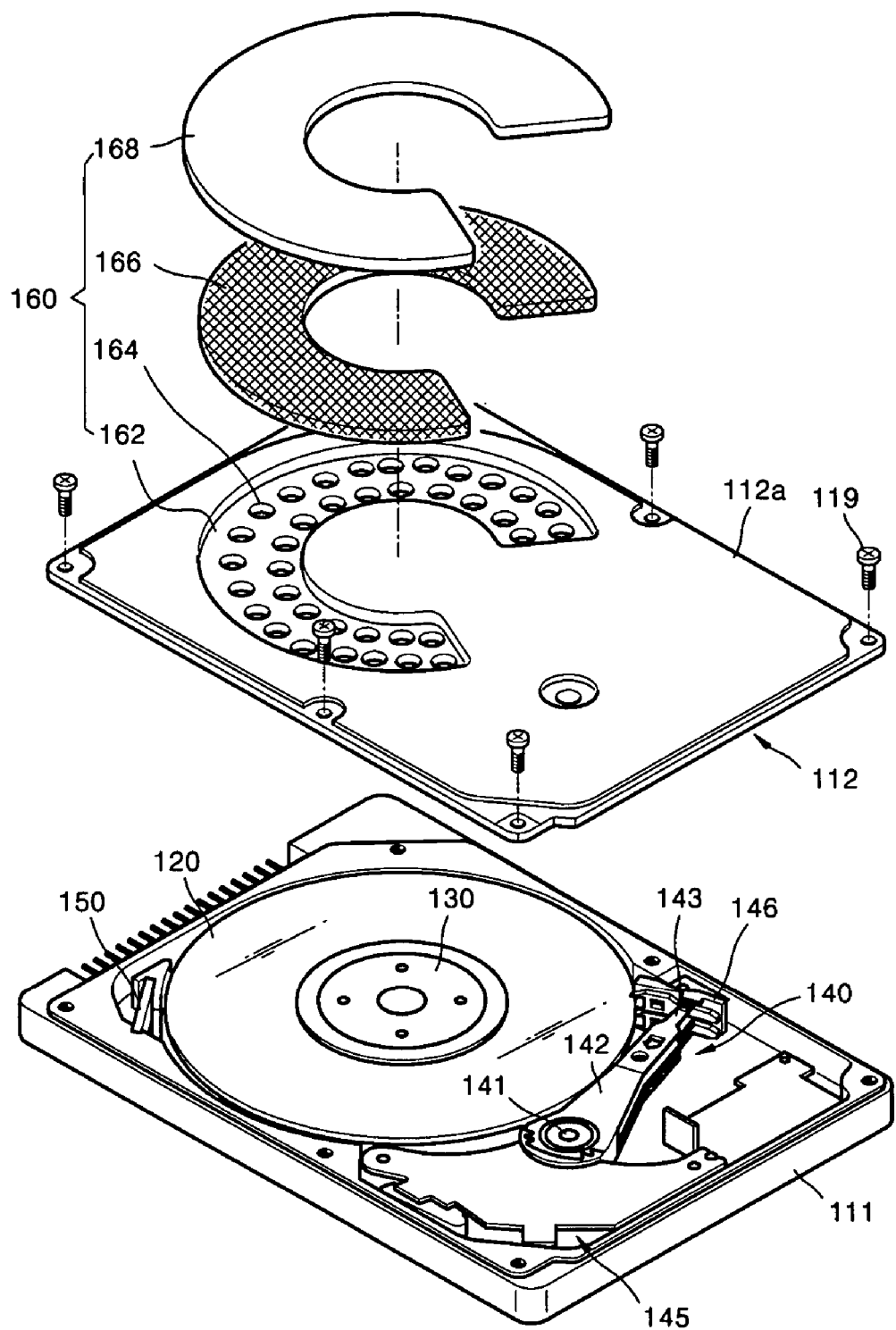
FIG. 3 is an exploded perspective view illustrating a disk drive having a noise reducing apparatus according to an embodiment of the present invention.
Figure 4:
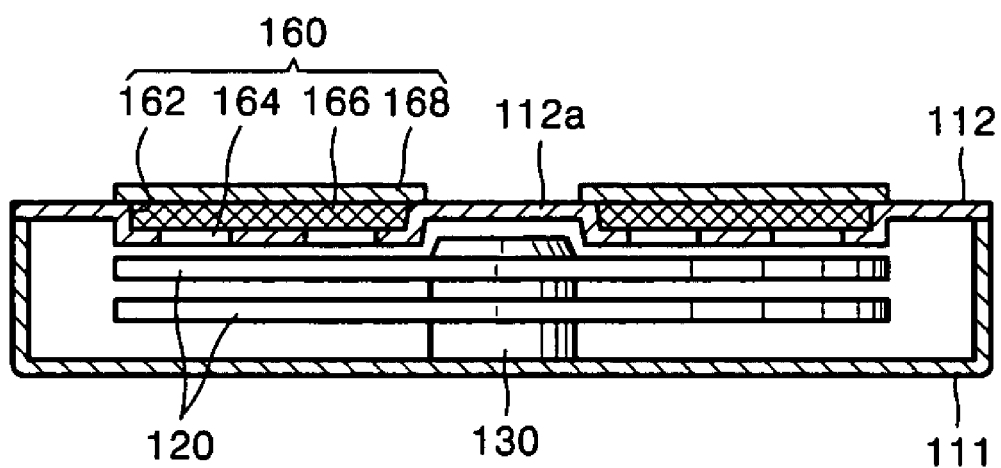
FIG. 4 is a sectional view illustrating the state in which the noise reducing apparatus of FIG. 3 is assembled to the disk drive.

Referring to FIGS. 3 and 4, a noise reducing apparatus 160 according to an preferred embodiment of the present invention is employed in a disk drive for reproducing or recording data with respect to a disk 120, to reduce noise generated from the inside of the disk drive and dissipated to the outside thereof.

The disk drive includes a base member 111, a spindle motor 130 to rotate a disk 120, an actuator 140, a cover member 112, and the noise reducing apparatus 160.

The base member 111 is typically manufactured of aluminum or an aluminum alloy by die-casting. However, it is understood that other materials and production techniques can be used. A space to accommodate the disk 120, the spindle motor 130, and the actuator 140 is formed on an upper surface of the base member 111. A circulation filter 150 to filter particle included in air flowing inside the disk drive is provided at one corner of the space. The spindle motor 130 is installed on the base member 111 of the disk drive. At least one disk 120 is installed on a hub of the spindle motor 130 and rotated with the hub.

The actuator 140 includes a swing arm 142, a suspension 143, and a voice coil motor (VCM) 145, to move a read/write head for recording and reproducing data from/to a predetermined position on the disk 120. The swing arm 142 is rotatably coupled to a pivot bearing 141 installed on the base member 111. The suspension 143 is coupled to a leading end portion of the swing arm 142 and supports a slider, on which the head is mounted, toward a surface of the disk 120 to be elastically biased. The voice coil motor 145 to provide a drive force to rotate the swing arm 142 is controlled by a servo control system and rotates the swing arm 142 in a direction following the Fleming's left hand rule by the interaction between current applied to a VCM coil and a magnetic field generated by a magnet. That is, when the power of the hard disk drive is on and the disk 120 starts to rotate, the voice coil motor 145 rotates the swing arm 142 counterclockwise to move the head toward a position above a recording surface of the disk 120. When the power of the hard disk drive is off and the disk 120 stops rotating, the voice coil motor 145 rotates the swing arm 142 clockwise so that the head is moved out of the disk 120. The head escaped the recording surface of the disk 120 is parked on a ramp 146 provided at the outside of the disk 120.

The cover member 112 is assembled to an upper portion of the base member 111 by using a plurality of screws 119 and protects the disk 120, the spindle motor 130, and the actuator 140 by encompassing the same. Also, the cover member 112 prevents intrusion of dust or moisture into the inside of the disk drive and is typically manufactured of a stainless steel plate by press-processing. However, it is understood that other fastening mechanisms can be used to connect the cover member 112 to the base member 111, and that the cover member 112 can be of other materials and made through other methods.

The noise reducing apparatus 160 according to an embodiment of the invention is provided on the cover member 112. The noise reducing apparatus 160 includes a groove 162 formed on an outer surface 112a of the cover member 112 to a predetermined depth. A plurality of through holes 164 are formed in a bottom surface of the groove 162. A sound-absorbing member 166 is accommodated in the groove 162 to absorb noise generated from the inside of the disk drive. A cover plate 168 is attached to the outer surface 112a of the cover member 112 to cover the sound-absorbing member 166.

As shown, the groove 162 is formed at a position where the noise pressure is high and the speed of air flow is fast in the disk drive (i.e., a position toward the rotating disk 120). Since the groove 162 protrudes toward the inside of the disk drive, the groove 162 has a "C" shape, exclusive of an operational area of the actuator 140, to avoid interference with the actuator 140. Thus, the conventional groove 13 shown in FIG. 1 can be used, as it is, as the groove 162 according to the present preferred embodiment. Accordingly, the groove 162 which decreases an interval between the disk 120 and the cover member 112 can reduce vibration of the disk 120. The depth of groove 162 is determined according to the thickness of the sound-absorbing member 166, which is described below, such that the cover member 112 does not contact the rotating disk 120. However, it is understood that the groove 162 can have other shapes, locations, and need not be used in all aspects of the invention.

The through holes 164 are formed in the bottom surface of the groove 162, by which the groove 162 is connected to the inside of the disk drive. While not required in all aspects, the through holes 164 are formed in a plurality of rows (for example, two rows) corresponding to the shape of the groove 162. Alternatively, the through holes 164 can be arranged in one row or three or more rows according to the width of the groove 162. Furthermore, the through holes 164 can be formed as one circular hole or as shown according to aspects of the invention in a random shape.

The sound-absorbing member 166 absorbs noise transferred through the through holes 164 and is formed of any material having the above function. According to an aspect of the invention, the sound-absorbing member 166 is formed of a porous material. The thickness of the sound-absorbing member 166 can be determined by considering the frequency band of noise to be reduced. Since the frequency band of the absorbed noise varies according to the thickness of the sound-absorbing member 166.

The cover plate 168 is formed to be slightly larger than the sizes of the sound-absorbing member 166 and the groove 162 so as to completely cover the sound-absorbing member 166. The cover plate 168 is attached to the outer surface 112a of the cover member 112 by using an adhesive or any other fastening mechanism. The cover plate 168 is formed of a metal plate exhibiting a high stiffness (for example, a stainless steel plate) to reflect the noise passing through the sound-absorbing member 166.

However, other materials can be used. In the noise reducing apparatus 160 according to the shown embodiment of the present invention, noise generated from the inside of the disk drive by the rotation of the disk 120, and in particular, the air-borne noise, is transferred to the sound-absorbing member 166 through the through holes 164. A considerable portion of the noise is absorbed by the sound-absorbing member 166. The noise passing through the sound-absorbing member 166 is reflected by the cover plate 168 which is rigid, and is returned to the sound-absorbing member 166, so that the noise dissipated to the outside of the disk drive can be reduced greatly.

Since the sound-absorbing member 166 is formed of a porous material, the air flowing in the disk drive can be input to the sound-absorbing member 166 through the through holes 164. Accordingly, particles included in the flowing air are filtered by the sound-absorbing member 166.

Figure 5:
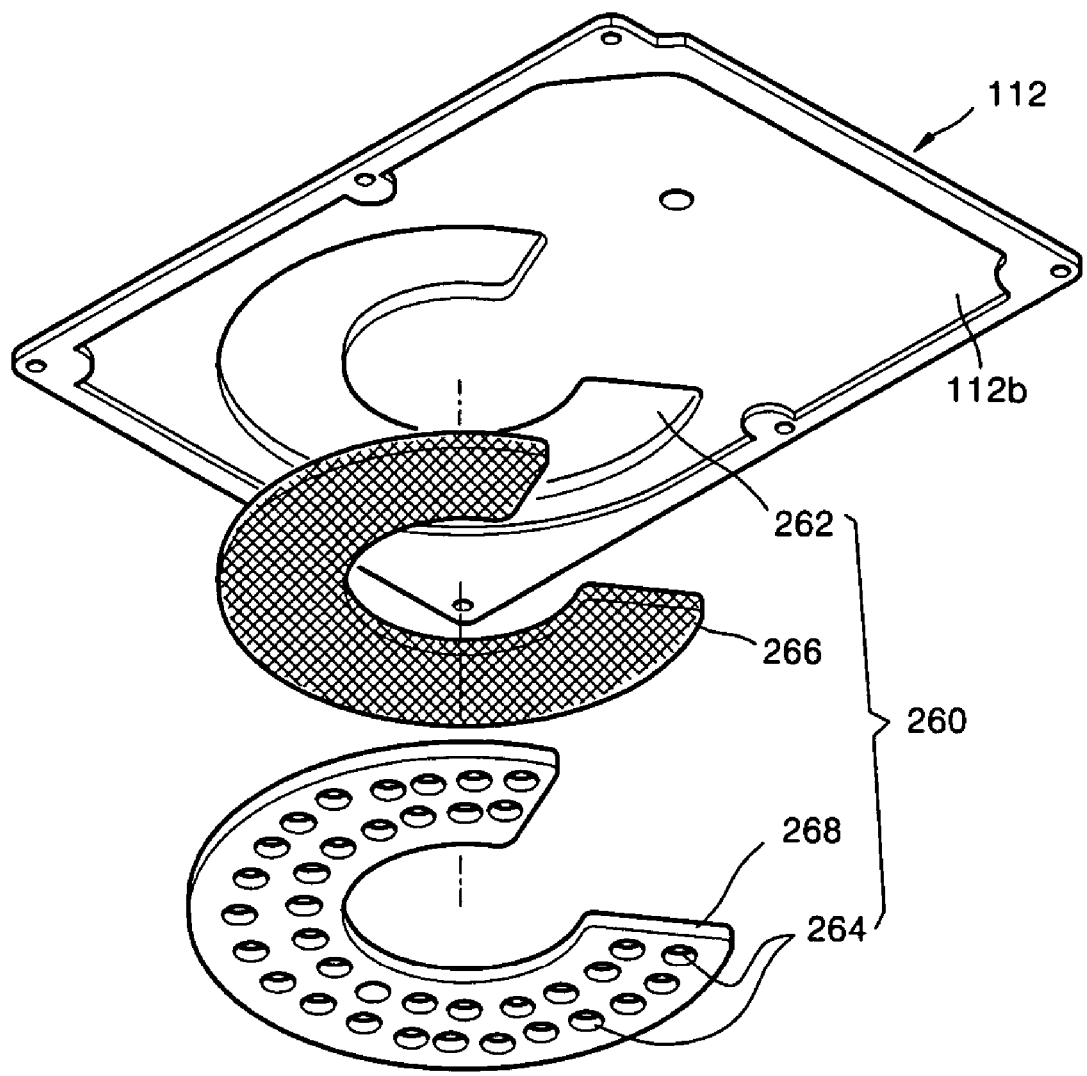
FIG. 5 is an explode perspective view illustrating a noise reducing apparatus according to an embodiment of the present invention, which is viewed from the inner surface of the cover member.
Figure 6:
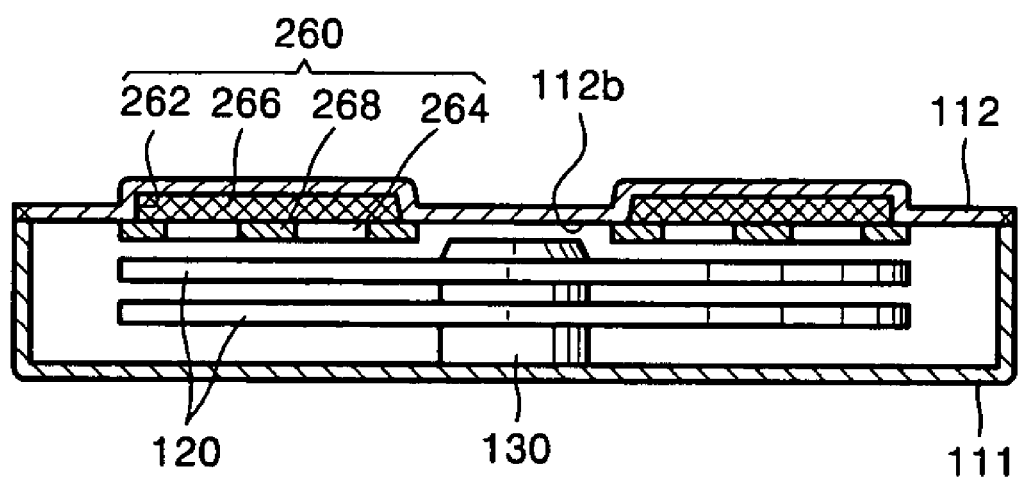
FIG. 6 is a sectional view illustrating the state in which the noise reducing apparatus of FIG. 5 is assembled to the disk drive.

FIG. 5 is an explode perspective view illustrating a noise reducing apparatus 260 according to another embodiment of the present invention, which is viewed from the inner surface of the cover member. FIG. 6 is a sectional view illustrating the state in which the noise reducing apparatus 260 of FIG. 5 is assembled to the disk drive. As shown, the noise reducing apparatus 260 is provided on the cover member 112 of the disk drive. However, in the noise reducing apparatus 260, a groove 262 having a predetermined depth and accommodating a sound-absorbing member 266 is characteristically formed on an inner surface 112b of the cover member 112 (i.e., a surface toward the disk 120). Accordingly, a cover plate 268 covering the sound-absorbing member 266 is attached to the inner surface 112b of the cover member 112 and a plurality of through holes 264 are formed in the cover plate 268.

While not required in all aspects, the groove 262 is preferably formed at a position toward the rotating disk 120 as in the embodiment shown in FIG. 3. The groove 262 is formed to a predetermined depth on the inner surface 112b of the cover member 112 to protrude outside the disk drive so that there the groove 262 does not directly interfere with the actuator 140. However, since the cover plate 268 covering the groove 262 may interfere with the actuator 140, to avoid such interference, the groove 262 is preferably formed in a C shape having an opening for the area for the operation of the actuator 140. The depth of the groove 262 is determined according to the thickness of the sound-absorbing member 266 which is described later. However, it is understood that the groove 262 can be otherwise shaped.

The sound-absorbing member 266 absorbs the noise transferred via the through holes 264 and is, while not required in all aspects of the invention, preferably made of a porous material. The thickness of the sound-absorbing member 266 can be determined considering the frequency band of noise to be reduced, as described above.

The cover plate 268 is formed to be slightly larger than the size of the sound-absorbing member 266 and the groove 262 to completely cover the sound-absorbing member 266 and is attached to the inner surface 112b of the cover member 112 by an adhesive. However, it is understood that other fastening mechanisms can be used. While not required in all aspects the cover plate 268 is preferably formed of a metal plate exhibiting a high stiffness, for example, a stainless steel plate, to sufficiently endure a change in the air pressure inside the disk drive. The shown cover plate 268 has a "C" shape having an opening for the area for the operation of the actuator 140 to avoid interference with the actuator 140, as described above. Also, the thickness of the cover plate 268 is determined within a range to avoid the interference with the disk 120. Since the interval between the disk 120 and the cover plate 268 is decreased by the cover plate 268, the vibration of the disk 120 can be reduced by a damping function of the air therebetween.

The through holes 264 are formed in the cover plate 268 so that the groove 262 and the inside of the disk drive are connected thereby. The through holes 264 are preferably arranged in the cover plate 268 in a row or in a plurality of rows, for example, in two rows, three rows, a plurality of rows, or in a random shape according to aspects of the invention.

The noise reducing apparatus 260 has the same effect as that of the above-described embodiment show in FIG. 3. That is, the noise generated in the disk drive, in particular, the air-borne noise, is transferred to the sound-absorbing member 266 through the through holes 264. The noise passing through the sound-absorbing member 266 is reflected by the cover member 112 and proceeds back to the sound-absorbing member 266. While passing through the sound-absorbing member 266, most of the air-borne noise is absorbed thereby so that the noise dissipated outwardly can be greatly reduced. Also, the air-borne noise can be reduced by the sound-absorbing member 266 in advance before it is transferred to the cover member 112.

In addition, the sound-absorbing member 266 formed of a porous material can filter particles included in the air flowing in the disk drive.

While described in terms of use in a hard disc drive, it is understood that the invention can be used in optical drives, such as Digital Versatile Disc (DVD) drives, and magneto_optical drives according to aspects of the invention. Moreover, while shown as being a separate unit, it is understood that the drive can be an internal drive in a computer system which uses the drive to store data.

As described above, according to the noise reducing apparatus for a disk drive according to the present invention, since the noise generated in the disk drive is absorbed by the sound-absorbing member provided on the cover member, the noise dissipated outwardly through the cover member can be effectively reduced. Furthermore, since air can be input to the sound-absorbing member through the through holes, particles included in the air in the disk drive can be filtered by the sound-absorbing member which is formed of a porous material.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A noise reducing apparatus for a disk drive including a base member, a spindle motor installed on the base member to rotate a disk for data storage, an actuator installed on the base member to move a read/write head to a predetermined position on the disk, and a cover member assembled to an upper portion of the base member, the noise reducing apparatus comprising:
   a groove formed on an outer surface of the cover member to a predetermined depth;
   a plurality of through holes formed on a surface of the groove and which connects to a space between the disc and the cover member;
   a sound-absorbing member accommodated in the groove to absorb noise generated from the disk drive; and
   a cover plate attached to the outer surface of the cover member to cover the sound-absorbing member.

2. The noise reducing apparatus as claimed in claim 1, wherein the through holes are arranged in a plurality of rows on the surface of the groove.

3. The noise reducing apparatus as claimed in claim 1, wherein the groove has a "C" shape having an opening for an area in which the actuator operates.

4. The noise reducing apparatus as claimed in claim 1, wherein the sound-absorbing member comprises a porous material.

5. The noise reducing apparatus as claimed in claim 1, wherein the cover plate comprises a metal plate.

6. The noise reducing apparatus as claimed in claim 5, wherein the metal plate comprises a stainless steel plate.

7. The noise reducing apparatus as claimed in claim 1, further comprising an adhesive that attaches the cover plate to the cover member.

* * * * *